United States Patent [19]

Solorow

[11] Patent Number: 4,918,369
[45] Date of Patent: Apr. 17, 1990

[54] HYDRO-ENERGY CONVERSION SYSTEM

[76] Inventor: Donald Solorow, 65 Prospect St., Stamford, Conn. 06902

[21] Appl. No.: 273,103

[22] Filed: Nov. 18, 1988

Related U.S. Application Data

[63] Continuation of Ser. No. 936,616, Dec. 1, 1986, abandoned.

[51] Int. Cl.⁴ .............................................. H02J 7/00
[52] U.S. Cl. ....................................... 322/35; 320/61; 290/54
[58] Field of Search .............. 320/61; 322/35; 290/43, 290/52, 54

[56] References Cited

U.S. PATENT DOCUMENTS

| | | | |
|---|---|---|---|
| 3,683,255 | 8/1972 | Schroeder | 322/35 |
| 3,921,052 | 11/1975 | Milano | 322/35 |
| 4,079,263 | 3/1978 | Inoue | 290/52 |
| 4,122,381 | 10/1978 | Sturm | 320/61 |
| 4,317,048 | 2/1982 | Kime | 290/54 |
| 4,352,025 | 9/1982 | Troyen | 290/54 |
| 4,408,127 | 10/1983 | Santos, Sr. | 290/54 |
| 4,489,290 | 12/1984 | Warner | 320/61 |
| 4,651,530 | 3/1987 | Omori | 122/406 ST |

*Primary Examiner*—Patrick R. Salce
*Assistant Examiner*—Kristine Peckman
*Attorney, Agent, or Firm*—Evelyn M. Sommer

[57] ABSTRACT

A water or fluid driven system is provided for use in a water open or closed loop system. The water driven system includes a flow control valve connected to a water line of the water open or closed loop system for controlling the flow of water into the water driven system, a turbine operatively connected to the flow control valve for receiving under controlled conditions the water, and a generator operatively connected to the turbine. The generator generates electricity in response to the operation of the turbine.

16 Claims, 2 Drawing Sheets

HYDRO-ENERGY CONVERSION SYSTEM

This application is a continuation, of application Ser. No. 06/936,616, filed Dec. 1, 1986 now abandoned.

BACKGROUND OF THE INVENTION

1. Field of the Invention

The present invention relates to a system for generating electricity and, more particularly, to a turbine or water wheel driven system for generating electricity.

2. Description of the Prior Art

The cost of power has continued to increase dramatically in the past few years. Accordingly, people reduce or eliminate the amount of power received from public utilities and thereby reduce costs. Some such alternative forms of power include hydroelectric power and water power. However, both hydroelectric and water power have, heretofore, required that the facility to receive such power be located in relatively close proximity to a stream or waterfall.

SUMMARY OF THE INVENTION

It is an object of the present invention to provide a turbine-driven system for generating electricity, which system can readily be inserted into a facility closed-loop system.

It is another object of the present invention to provide such a turbine-driven system which utilizes otherwise waste water surge and flow.

It is yet another object of the present invention to provide a turbine-driven system for generating electricity which system can readily be inserted into an open loop system.

It is still another object of the present invention to provide such a turbine-driven system which does not use a stream, waterfall or other natural bodies of water and therefore does not need to be located in proximity to such bodies of water.

It is still a further object of the present invention to provide such a turbine or water wheel driven system which utilizes surge, flow and discharge of water flowing within an enclosed conduit or pipe.

It is yet another object of the present invention to provide such a system which utilizes water in the facility's central air conditioning system.

These and other objects of the present invention are provided by a water or other fluid driven system adapted to be included in a closed or open loop water system. The water driven system includes a flow control valve connected to the water line of the water system for controlling the flow of water, a turbine operatively connected to the flow control valve for receiving under controlled conditions the water from the water system, and a generator operatively connected to the turbine for generating electricity in response to operating of the turbine.

While the discussion on this application addresses water systems, it is to be understood that the principles disclosed apply equally to fluid systems including gas, steam and the like. More specifically, the invention provides a water or other fluid driven system adapted to be included in a closed loop waste water system. The water driven system includes a flow control valve connected to the water line of the water system for controlling the flow of water, a turbine operatively connected to the flow control valve for receiving under controlled conditions the water from the water system, and a generator operatively connected to the turbine for generating electricity in response to the operation of the turbine.

BRIEF DESCRIPTION OF THE DRAWINGS

This invention will now be described with reference to the accompanying drawings which illustrates by way of example two possible embodiments.

DESCRIPTION OF THE PREFERRED EMBODIMENTS

Figure 1:
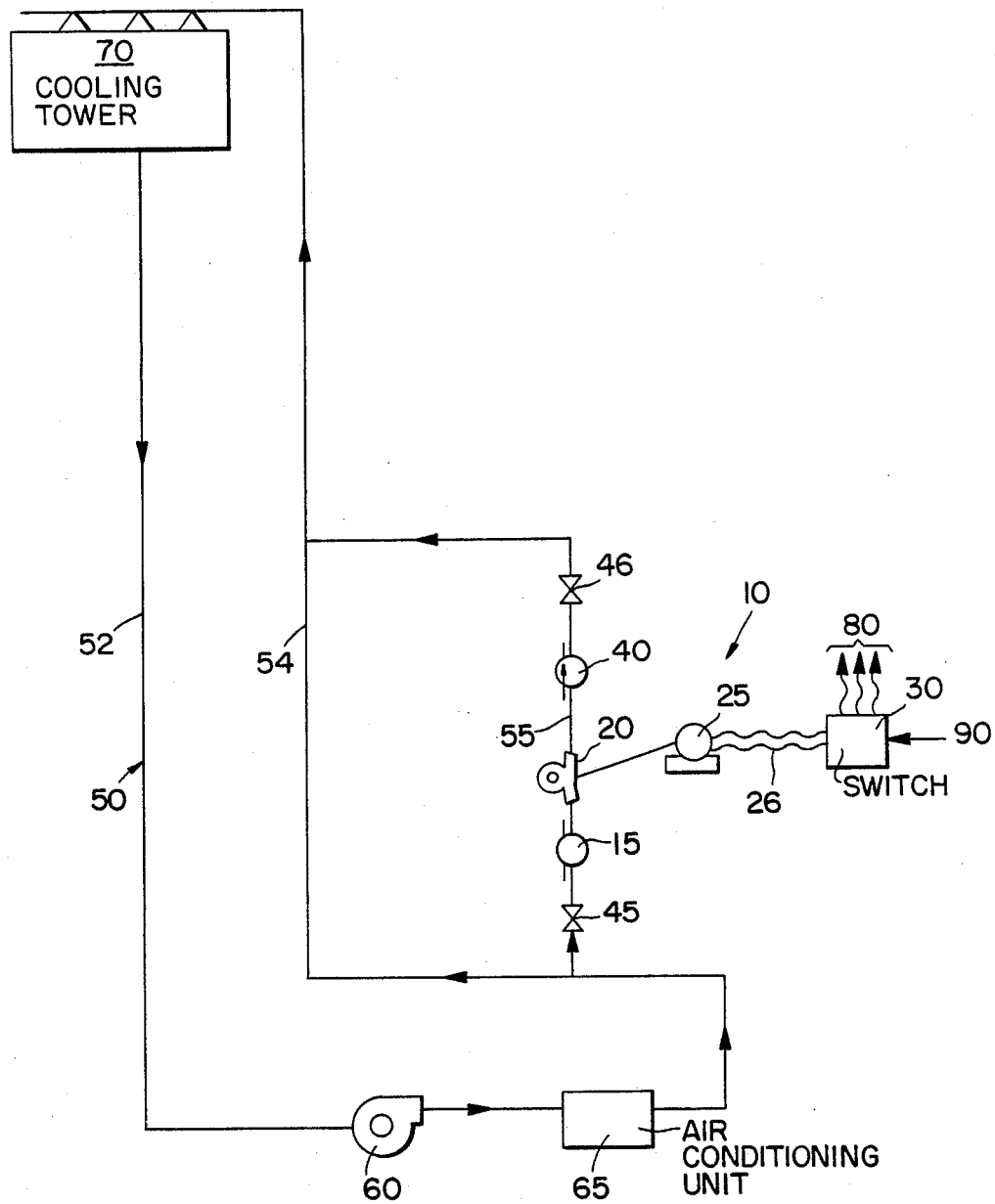
FIG. 1 is a schematic of one possible embodiment of the system of the present invention.

Referring to FIG. 1, there is provided a system for generating electricity generally represented by reference numeral 10. The system 10 includes, in series, a flow control valve 15 and a turbine or water wheel 20. The system also includes a generator 25 operatively connected to the turbine 20 and includes a transfer switch 30. In the series of flow control valve 15 and turbine 20, it is preferable that after the turbine there be included a check valve 40.

System 10 is included on pipe 55 of the pipe system 50 of an open loop water system. System 10 can be operatively disconnected from receiving water from the pipe system 50 by closing shut-off valve 45 and can be operatively disconnected from supplying water to the pipe system by closing shut-off valve 46.

The open loop water system in FIG. 1 includes pipe system 50 which connects together a central air conditioning unit 65 to a cooling tower 70.

In many facilities, the central air conditioning unit 65 can be located on the roof or an upper floor of the facility, while the cooling tower 70 almost always is located on the roof of the facility. To positively feed water from the cooling tower 70 to the central air conditioning unit 65, a pump 60 is located in the feed position 52 of the pipe system 50 which portion feeds water from the cooling tower to the central air conditioning unit 65. It is preferable that the pump 60 be a centrifugal pump. Water emitted from the central air conditioning unit 65 is returned to the cooling tower 70 by return pipe 54 of pipe system 50. This emitted water is water which may be reused. It is along the return pipe 54 that pipe 55 is connected into the open loop system.

Referring to system 10, flow control valve 15 is any conventional flow control valve which controls water flow and pressure along pipe 55. The turbine or water wheel 20 can be any conventional turbine or water wheel. It is recommended that conventional Pelton water wheels be used. Such standard Pelton water wheels include the Models 450, 600, 900, 1200, 1500, 1800, 2400, 3000, or 3600 HS-1 water turbine. All of the above Models are high speed, high performance wheels and preferably are made of stainless steel. The tens, hundred and thousands number indicates the pitch diameter of the wheel. For example, Model 450 has a 4½ inch pitch diameter, Model 900 has a 9 inch pitch diameter, Model 1800 has an 18 inch pitch diameter and Model 3000 has a 30 inch pitch diameter. The pitch diameter, and therefore the model of turbine, depends on the diameter of the nozzle used.

The following is a chart of the Model number and diameter size of the nozzle for use with that Model.

| MODEL NO. | NOZZLE DIAMETER (in inches) |
| --- | --- |
| 450 | ¾ |
| 600 | 1 |
| 900 | 1⅜ |
| 1200 | 2 |
| 1500 | 3 |
| 1800 | 3½ |
| 2400 | 5¼ |
| 3000 | 6¼ |
| 3600 | 7 |

For information concerning the power of each wheel, standard operation manuals should be consulted.

Piping from discharge of turbine or water wheel 20 contains a check valve 40. Check valve 40 is any conventional check valve which prevents water from backflowing in pipe 55 on the side of shut-off valve 46 back towards turbine 20.

Generator 25, which is directly connected to the turbine 20, can be a conventional AC generator or conventional DC generator. A DC or battery storage generator when used does not require a governor speed controller which is normally needed in an alternating current or AC generation. Such DC generators come in many voltages, such as 6, 12, 24, 36, 120, and 240 volts, however 12 or 120 volt DC generators are recommended.

Generator 25 is directly connected to the automatic transfer switch 30.

Switch 30 is connected by wiring 80 to an external load. Also, switch 30 is connected to receive a power load 90 from an external source, such as a public utility.

Concerning the operation of the system 10 in the open loop system, water from cooling tower 70 is forced by centrifugal pump 60 through feed pipe 54 to central air conditioning unit 65. Water from air conditioning unit 65 returns to cooling tower 70 via return pipe 54. Should shut-off valves 45 and 46 be open, some water will be diverted to system 10. In system 10, flow control valve 15 controls the amount and pressure of the water flowing through turbine 20. Turbine 20 is operatively connected to generator 25 so that generator 25 produces power in the form of electricity which is forwarded via wiring 26 to switch 30. Switch 30 acts to forward electricity from generator 25 to load 80 and to control the sending of electricity from generator 25. Utility power source 90 is connected to switch 30 so that utility power source 90, on failure of turbine or water wheel 20, causes switch 30 to automatically transfer load 80 to utility power source 90.

It is anticipated that with a water flow rate of 600 gallons per minute and at 7.5 feet per second and based on an average cost of eleven cents by kilowatt hour, the present invention can save $42,500 per year. Greater savings are possible with large units 10 or multiple units 10, where available water flow is greater than 600 gallons per minute.

In FIG. 1, the water open loop system in the facility is that of the central air conditioning system of the facility. However, the water open or closed loop system could be a sewage treatment system with the system 10 located at the discharge point of the sewage treatment system. Basically, system 10 can be employed in any water closed or open loop system by making use of wasted or unwanted water surge and flow.

Figure 2:
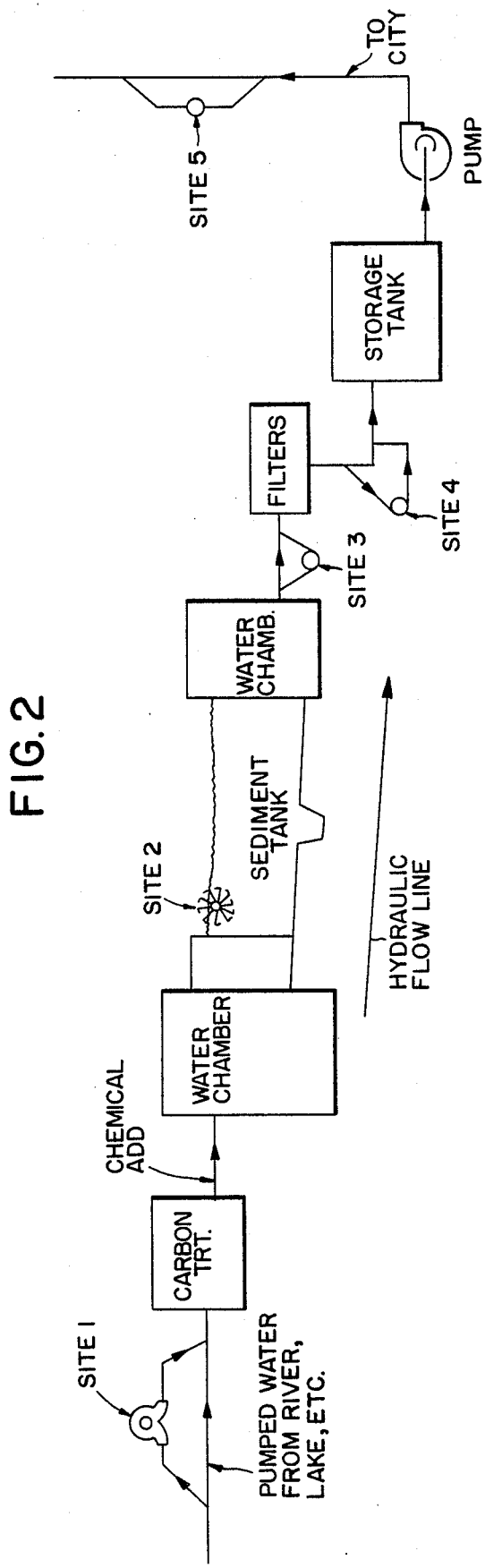
FIG. 2 is a flow sheet of the hydraulic flow line of a water treatment facility showing five sites for application of the system of the invention.

In FIG. 2, the application of the system of the invention to multiple sites of a water treatment plant is shown. In this illustration, the power derived can be taken off separately from one or more of the sites, or collected and in either form utilized in part, with the balance delivered to a utility.

I claim:

1. A water driven system included in a water line of a closed loop water system, said water driven system comprising:
   a flow control valve for controlling the flow of the water in said closed loop water system;
   a turbine operatively connected to said flow control valve for receiving under controlled conditions the water from said closed loop water system;
   a check valve located immediately downstream of said turbine to prevent water from flowing back into said turbine thereby protecting said turbine from damage;
   a first shut-off valve for connecting said water driven system to said closed loop water system and located at a point upstream of said flow control valve and said turbine, wherein said first shut-off valve permits water to flow from said closed loop water system into said water driven system when said first shut-off valve is open;
   a second shut-off valve for connecting said water driven system to said closed loop water system and located at a point downstream of said flow control valve and said turbine, wherein said second shut-off valve permits water to flow from said water driven system into said closed loop water system when said second shut-off valve is open; and
   a generator operatively connected to said turbine for generating electricity in response to operation of said turbine.

2. The water driven system of claim 1, further including an automatic transfer switch connected to said generator.

3. The water driven system of claim 1, wherein said generator is an A.C. generator.

4. The water driven system of claim 1, wherein said generator is a D.C. generator.

5. The water driven system of claim 1, wherein said water line is a waste water line.

6. The water driven system of claim 1, further comprising an automatic transfer switch which is directly connected to said generator, and is also connected to an external load and to a utility power source.

7. The water driven system of claim 6, wherein said transfer switch automatically transfers the external load to said utility power source on failure of said turbine to operate.

8. A fluid driven system included in a fluid line of a loop fluid system, said fluid driven system comprising:
   a flow control valve for controlling the flow of the fluid in said loop fluid system;
   a turbine operatively connected to said flow control valve for receiving under controlled conditions the fluid from said loop fluid system;
   a check valve located immediately downstream of said turbine to prevent fluid from flowing back into said turbine thereby protecting said turbine from damage;
   a first shut-off valve for connecting said fluid driven system to said loop fluid system and located at a point upstream of said flow control valve and said turbine, wherein said first shut-off valve permits fluid to flow from said loop fluid system into said fluid driven system when said first shut-off valve is open;

a second shut-off valve for connecting said fluid driven system to said loop fluid system and located at a point downstream of said flow control valve and said turbine, wherein said second shut-off valve permits water to flow from said fluid driven system into said loop fluid system when said second shut-off valve is open; and a generator operatively connected to said turbine for generating electricity in response to operation of said turbine.

9. The fluid driven system of claim 8, wherein said loop fluid system is an open loop fluid system.

10. The fluid driven system of claim 8, wherein said loop fluid system is a closed loop fluid system.

11. The fluid driven system of claim 8, further comprising an automatic transfer switch which is directly connected to said generator, and is also connected to an external load and to a utility power source.

12. The fluid driven system of claim 11, wherein said transfer switch automatically transfers the external load to said utility power source on failure of said turbine to operate.

13. A water driven system included in a water line of an open loop water system, said water driven system comprising:

a flow control valve for controlling the flow of the water in said open loop water system;

a turbine operatively connected to said flow control valve for receiving under controlled conditions the water from said open loop water system;

a check valve located immediately downstream of said turbine to prevent water from flowing back into said turbine thereby protecting said turbine from damage;

a first shut-off valve for connecting said water driven system to said open loop water system and located at a point upstream of said flow control valve and said turbine, wherein said first shut-off valve permits water to flow from said open loop water system into said water driven system when said first shut-off valve is open;

a second shut-off valve for connecting said water driven system to said open loop system and located at a point downstream of said flow control valve and said turbine, wherein said second shut-off valve permits water to flow from said water driven system into said open loop water system when said second shut-off valve is open; and a generator operatively connected to said turbine for generating electricity in response to operation of said turbine.

14. The water driven system of claim 13, wherein said water line is a waste water line.

15. The water driven system of claim 13, further comprising an automatic transfer switch which is directly connected to said generator, and is also connected to an external load and to a utility power source.

16. The water driven system of claim 15, wherein said transfer switch automatically transfers the external load to said utility power source on failure of said turbine to operate.

* * * * *